United States Patent
Jaradi et al.

(10) Patent No.: US 9,321,423 B2
(45) Date of Patent: Apr. 26, 2016

(54) ROOF MOUNTED REAR SEAT AIRBAG SAFETY CAGE

(71) Applicant: Ford Global Technologies, LLC, Dearborn, MI (US)

(72) Inventors: Dean M. Jaradi, Macomb, MI (US); Iskander Farooq, Novi, MI (US); Mohammed Omar Faruque, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/446,284

(22) Filed: Jul. 29, 2014

(65) Prior Publication Data

US 2016/0031401 A1 Feb. 4, 2016

(51) Int. Cl.
*B60R 22/00* (2006.01)
*B60R 21/232* (2011.01)
*B60R 21/015* (2006.01)
*B60R 21/231* (2011.01)
*B60R 21/01* (2006.01)

(52) U.S. Cl.
CPC ............. *B60R 21/232* (2013.01); *B60R 21/015* (2013.01); *B60R 2021/01013* (2013.01); *B60R 2021/01516* (2013.01); *B60R 2021/01533* (2013.01); *B60R 2021/23153* (2013.01)

(58) Field of Classification Search
CPC ..................... B60W 2040/0881; B60W 40/08; B60W 2420/52; B60R 21/01554; B60R 2022/4825
USPC .......... 701/36, 45, 49, 47; 180/268, 271–274; 280/735, 739

See application file for complete search history.

(56) References Cited

U.S. PATENT DOCUMENTS

| | | | |
|---|---|---|---|
| 5,470,103 A | 11/1995 | Vaillancourt | |
| 6,220,625 B1 * | 4/2001 | Wallner et al. | ............. 280/730.2 |
| 6,520,572 B1 * | 2/2003 | Niederman et al. | .......... 296/219 |
| 7,195,276 B2 | 3/2007 | Higuchi | |
| 7,511,833 B2 * | 3/2009 | Breed | ........................... 356/614 |
| 7,862,074 B2 | 1/2011 | Deng | |
| 7,997,615 B2 | 8/2011 | Jang | |
| 8,087,690 B2 | 1/2012 | Kim | |
| 8,403,358 B2 | 3/2013 | Choi | |
| 8,573,634 B2 | 11/2013 | Choi | |
| 2003/0141708 A1 * | 7/2003 | Enders | ....................... 280/730.2 |

* cited by examiner

*Primary Examiner* — Dalena Tran
(74) *Attorney, Agent, or Firm* — James P. Muraff; Neal, Gerber & Eisenberg LLP (57) ABSTRACT

Described herein is a rear seat airbag deployment system, a rear seat airbag of the rear seat airbag deployment system, and a method of deploying the rear seat airbag. The rear seat airbag is configured in a substantially 'U' shape to encompass both the front and rear sides of rear seat occupants when the rear seat airbag is deployed. It follows that the rear seat airbag provides a safety cage that surrounds rear seat passengers upon deployment. Exemplary embodiments may further include an airbag deployment tool for gathering vehicle state information, analyzing the vehicle state information, determining whether to deploy one or more airbags, and controlling the deployment of the rear seat airbag.

20 Claims, 5 Drawing Sheets

ROOF MOUNTED REAR SEAT AIRBAG SAFETY CAGE

TECHNICAL FIELD

This disclosure generally relates to a roof mounted rear seat airbag safety cage and a method of deploying a roof mounted rear seat airbag safety cage.

BACKGROUND

Providing safety features is an important priority when manufacturing a vehicle, such as a passenger car or truck, which will be promoted for sale to a consumer. This includes providing safety features that will provide protection to not only front seat passengers, but also rear seat passengers. One such safety feature that may be included in a vehicle is an airbag.

Due to the unique seating arrangement for rear seat passengers that may differ from the seating arrangement of front seat passengers, a unique type of airbag may be provided as a safety feature for protecting rear seat passengers.

SUMMARY

This application is defined by the appended claims. The description summarizes aspects of the embodiments and should not be used to limit the claims. Other implementations are contemplated in accordance with the techniques described herein, as will be apparent upon examination of the following drawings and detailed description, and such implementations are intended to be within the scope of this application.

Exemplary embodiments provide a rear seat airbag configured in a substantially 'U' shape to encompass both the front and rear sides of rear seat occupants when the rear seat airbag is deployed. Exemplary embodiments may also include a rear seat airbag deployment system, and an airbag deployment tool for gathering vehicle state information, analyzing the vehicle state information, determining whether to deploy one or more airbags, and controlling the deployment of the one or more airbags.

According to some embodiments, a vehicle rear seat airbag deployment system is provided. The vehicle rear seat airbag deployment system may comprise a vehicle frame including a roof railing portion; a rear seat airbag attached to the roof railing portion by a plurality of connectors; an inflator in communication with the rear seat airbag; and a processor in communication with the inflator. The processor may be configured to: receive vehicle sensor information; analyze the vehicle sensor information; and control the inflator to inflate the rear seat airbag based on the analysis.

According to some embodiments, a method for deploying a rear airbag in a rear seating area of a vehicle. The method may comprise: receiving, by a processor, vehicle sensor information from one or more vehicle sensors; analyzing, by the processor, the vehicle sensor information; and controlling, by the processor, an inflator to inflate a rear seat airbag stored within a ceiling above a rear seating area of the vehicle based on the analysis.

BRIEF DESCRIPTION OF THE DRAWINGS

For a better understanding of the invention, reference may be made to embodiments shown in the following drawings. The components in the drawings are not necessarily to scale and related elements may be omitted so as to emphasize and clearly illustrate the novel features described herein. In addition, system components can be variously arranged, as known in the art. In the figures, like referenced numerals may refer to like parts throughout the different figures unless otherwise specified.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated. Not all of the depicted components described in this disclosure may be required, however, and some implementations may include additional, different, or fewer components from those expressly described in this disclosure. Variations in the arrangement and type of the components may be made without departing from the spirit or scope of the claims as set forth herein.

A vehicle may offer an airbag system that includes one or more airbags placed at different locations within the vehicle's cabin that are configure to deploy based on a detection of an impact suffered by the vehicle. While much attention has been given to creating an airbag system for protecting front seat passengers, less attention has been given to airbag systems for protecting rear seat passengers.

Therefore, a rear seat passenger airbag system is disclosed that is configured to protect passengers seated in a rear seat cabin area of a vehicle. The rear seat passenger airbag system is able to protect rear seat passengers in frontal, side, or rear crashes by offering a 'U' shaped curtain type of rear airbag configured to fall from a ceiling of the vehicle cabin to protect both the front and sides of rear seated passengers. Upon deployment, this rear airbag surrounds rear passengers to protect their heads and knees from impacting the front passenger seats, rear doors, and other objects in the rear seat cabin that may cause injury to the rear seat passengers.

More specifically, the rear seat passenger airbag system includes the 'U' shaped curtain type of rear airbag to fall from a ceiling of the vehicle cabin to protect both the front and sides of rear seated passengers. The rear seat passenger airbag system may also include one or more connection members for attaching the rear airbag to a cabin frame of the vehicle. The rear seat passenger airbag system may also include an airbag deployment tool configured to receive sensor information, analyze the received sensor information, determine whether to deploy the rear airbag, and control the deployment of the rear airbag based on the determination. The sensor information received by the airbag deployment tool may, for example, include impact sensor information sensed from one or more impact sensors included at various locations on the vehicle, or passenger information sensed from one or more passenger identification sensors located within the rear passenger cabin.

The airbag deployment tool may be a program, application, and/or some combination of software and hardware that is incorporated on one or more of the components that comprise the vehicle's operating system. Further description for the airbag deployment tool and the components of the vehicle's vehicle system running the airbag deployment tool is described in more detail below.

Figure 1:
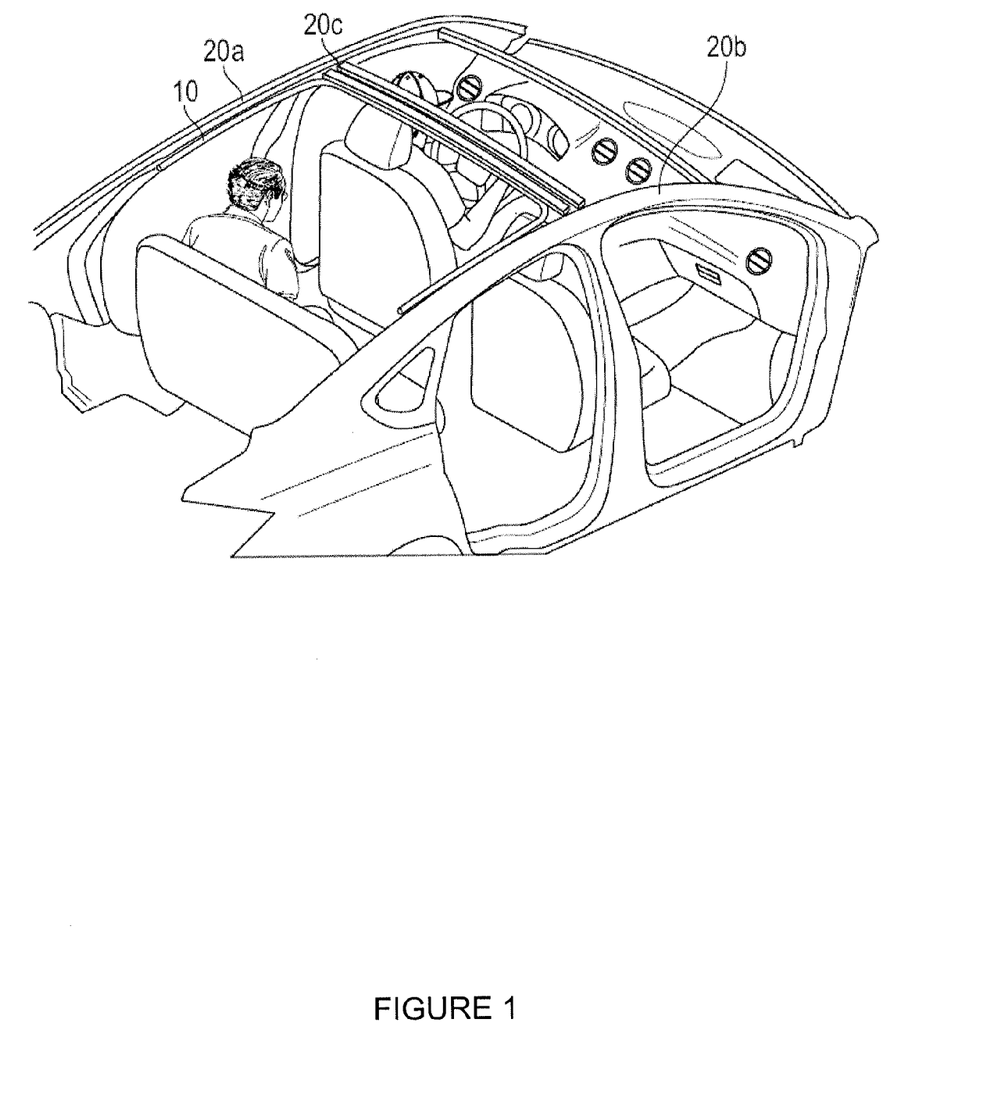
FIG. 1 illustrates an exemplary cross-sectional view of a vehicle including a rear airbag deployment system in an airbag stored state according to some embodiments.

FIG. 1 illustrates the rear seat passenger airbag system according to some embodiments. The rear seat passenger airbag system includes a rear airbag 10 stored within a ceiling lining above a rear passenger cabin section. The rear airbag 10 may be stored in a rolled-up state or accordion style fold-up state according to some embodiments. As illustrated in FIG. 1, the rear airbag 10 is stored along the ceiling above the rear passenger cabin in a substantially 'U' shape. The rear airbag 10 is able to maintain the 'U' shape while stored within the ceiling lining by being attached to a ceiling frame surrounding the rear seat passenger section. The roof frame illustrated in FIG. 1 is identified by driver side roof rail 20a, passenger side roof rail 20b, and center cross member 20c. The roof frame may be made from a metallic material and be partitioned into three pieces that are welded together such as driver side roof rail 20a, passenger side roof rail 20b, and center cross member 20c illustrated in FIG. 1, or the roof frame to which the rear airbag 10 is attached may be formed from a single piece (not specifically illustrated).

In the stored state, the rear airbag 10 be packaged along the cabin ceiling to be under the vehicle roof and above a headliner trim behind the rear most position of the front seats. The rear airbag 10 may further be stored along the driver side roof rail 20a, passenger side roof rail 20b, and the center cross member 20c in order to for, the 'U' shape above the rear passenger seating area. In order to facilitate the deployment of the rear airbag 10, the ceiling lining may be made to include a slit, seam, or plastic cover trim positioned underneath the stored rear airbag 10. By including, for example, such a slit, seam, or plastic cover trim positioned underneath the stored rear airbag 10, the rear airbag 10 may successfully be deployed to fall down into the rear passenger seating area.

Figure 2:
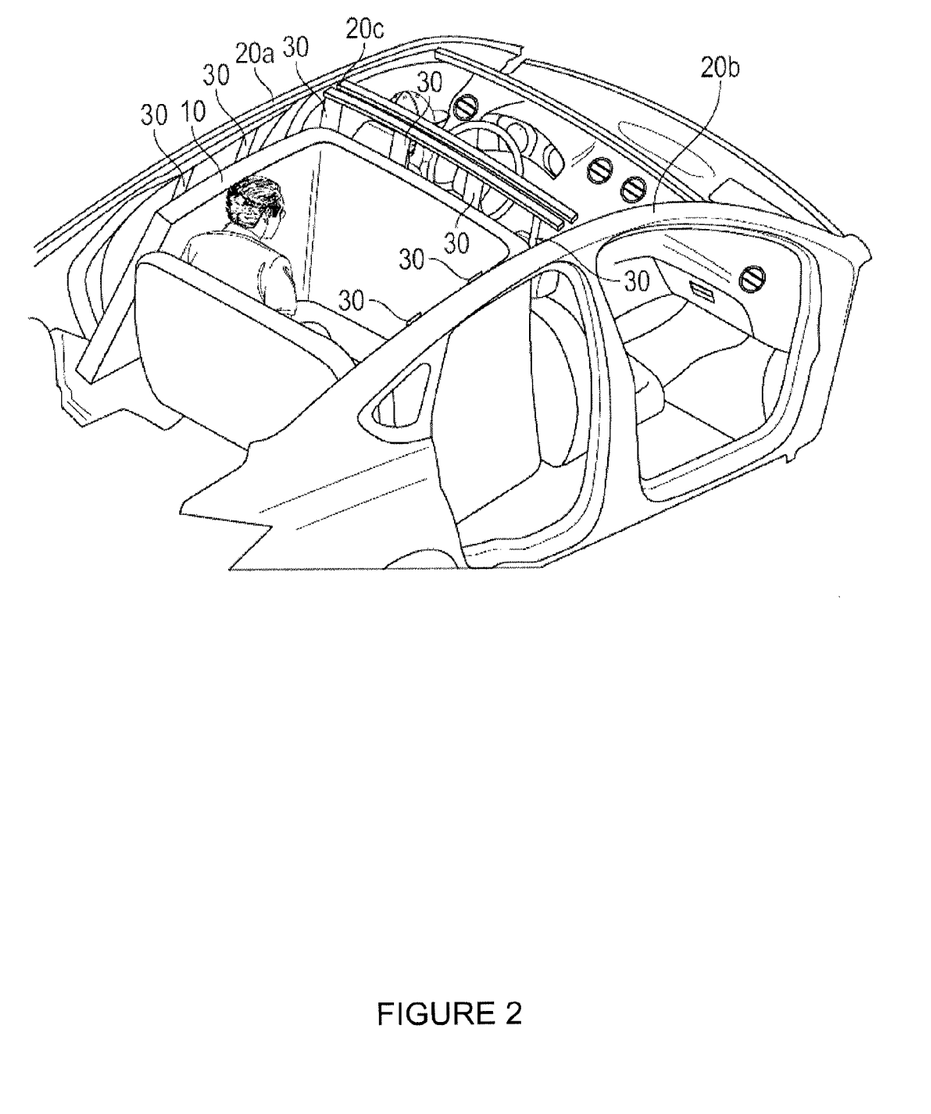
FIG. 2 illustrates an exemplary cross-sectional view of a vehicle including a rear airbag deployment system in an airbag deployed state according to some embodiments.

FIG. 2 illustrates a cross sectional view of the vehicle in which the rear airbag 10 is in a deployed state. The rear airbag 10 may have dropped down from the ceiling lining through the slit, seam, or plastic cover trim positioned underneath the stored rear airbag 10 described above. In the deployed state, FIG. 2 illustrates the rear airbag 10 being formed of a single inflated piece in an exemplary embodiment. The rear airbag 10 may have been deployed by one or more inflators located along any one or more of the driver side roof rail 20a, passenger side roof rail 20b, or the center cross member 20c. The one or more inflators may further be in communication with the rear airbag 10 in order to inflate the rear airbag 10 upon receiving commands from the airbag deployment tool to inflate the rear airbag 10. According to a preferred embodiment, the rear airbag 10 may be a single inflatable piece that is deployed by a single inflator located along the center cross member 20c. However, according to other embodiments, the rear airbag 10 may be formed by a plurality of partitioned sections wherein each partitioned section is in communication with an inflator for inflating the corresponding partitioned section of the rear airbag 10.

FIG. 2 further illustrates a plurality of connectors 30, wherein one end of the connectors 30 is attached to the vehicle roof frame (e.g., driver side roof rail 20a, passenger side roof rail 20b, and the center cross member 20c) and the other end is attached to a section of the rear airbag 10. The connectors 30 may, for example, be a system of tethering members, hooking members, velcro attachment members, or other similar type of connection members that serve to effectively attach the rear airbag 10 to the vehicle's roof frame. The utilization of the connectors 30 may also serve to maintain the rear airbag 10's 'U' shape during deployment of the rear airbag 10, and also after deployment of the rear airbag 10 as illustrated in FIG. 2.

Figure 3:
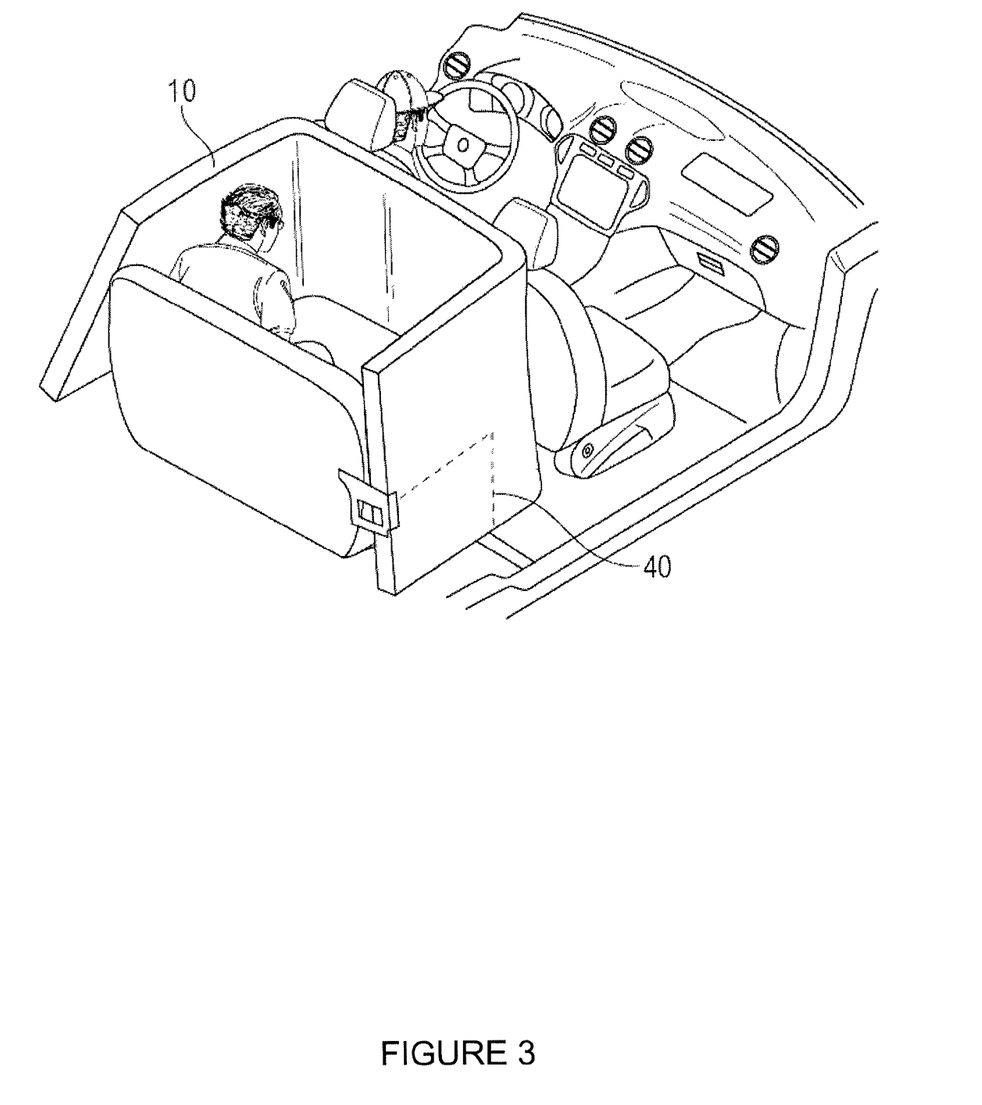
FIG. 3 illustrates an exemplary cross-sectional view of a vehicle including a rear airbag deployment system in an airbag deployed state according to some embodiments.

FIG. 3 illustrates a cross sectional of the vehicle in which the rear airbag 10 is in a deployed state. The view provided by FIG. 3 has additionally taken out the vehicle's roof frame in order to provide a more compete view of the rear airbag 10 in the deployed state. As illustrated, the rear airbag 10 is inflated into the 'U' shape in order to protect in front of the rear passengers, and to protect on both sides of the rear passengers. Due to the 'U' shape of the rear airbag 10 essentially encompassing all rear passengers into a safety cage, a rear seat passenger that is sitting within the middle space will be protected from moving forward by the rear airbag 10 in front of the passenger when the rear airbag 10 is deployed. Other known rear airbag systems fail to account for rear seat passenger sitting within the middle space, however the rear airbag 10 disclosed herein serves to protect all rear seated passengers by providing the protective 'U' shaped cage of the rear airbag 10.

In some embodiments, the rear airbag 10 may be modified to take on the form of the rear passenger seats. For example, FIG. 3 illustrates the rear airbag 10 having been formed along the cut-out section 40 in order to adapt to the rear passenger seats. By forming the rear airbag 10 to fit along with the rear passenger seats, the rear airbag 10 may fully deploy down from the ceiling into the curtain form to better form the protective cage around the rear seat passengers.

Figure 4:
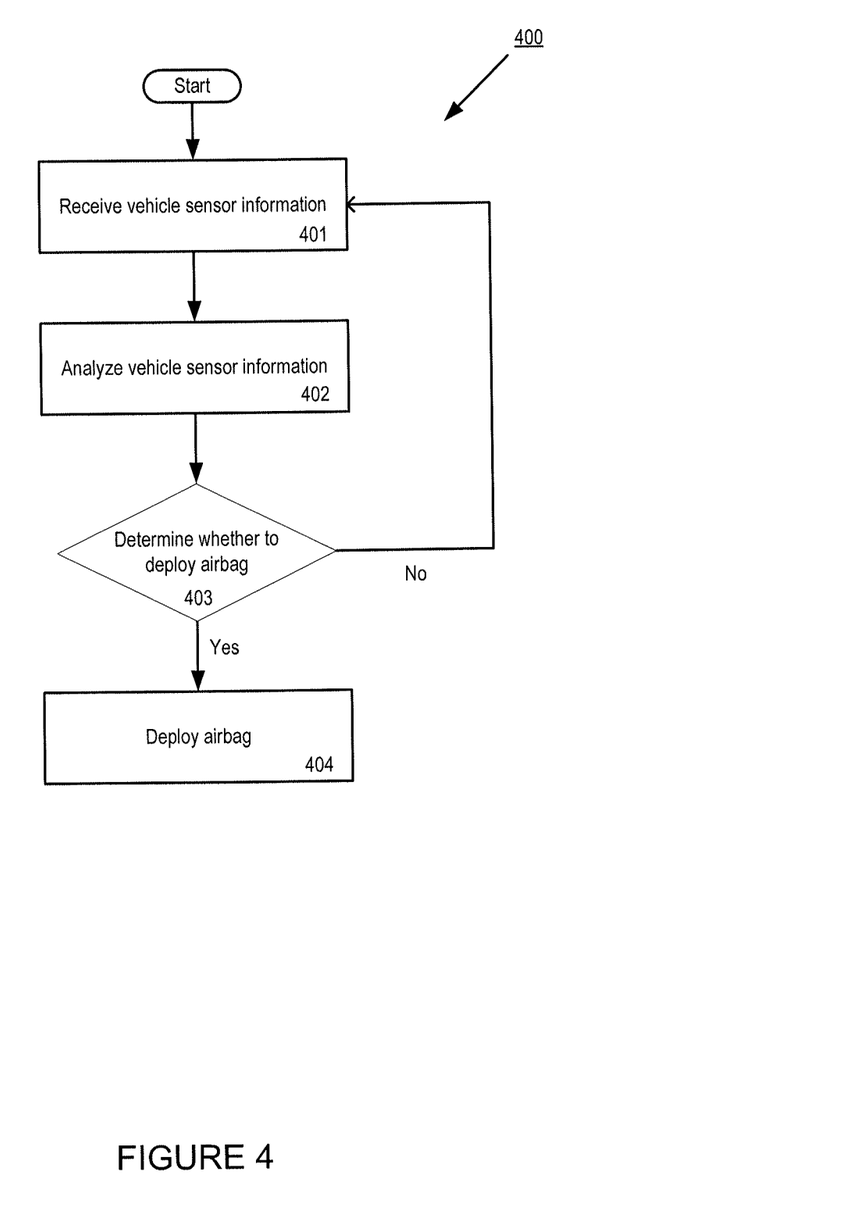
FIG. 4 illustrates an exemplary flow chart describing a process according to some embodiments.

FIG. 4 illustrates an exemplary flow chart 400 describing a process for the airbag deployment tool according to some embodiments. The process described by flow chart 400 describes exemplary steps that may be implemented by the airbag deployment tool for determining whether to deploy the rear airbag that is part of the rear seat passenger airbag system described herein. The steps of the process described below is provided for exemplary purposes, as it is within the scope of this disclosure for the airbag deployment tool to implement a greater, or fewer, number of steps in order to determine whether to deploy the rear airbag described herein. Further description is now provided describing the flow chart 400.

At 401, the airbag deployment tool may receive vehicle sensor information. The vehicle sensor information may include impact information received from one or more impact sensors located at one or more locations on the vehicle. The vehicle sensor information may also include occupant classification information received from one or more occupant classification sensors (OCS). An OCS sensor may include an infrared (IR) proximity sensor located in the rear passenger seating area configured to detect a passenger seated in the rear passenger seating area and generate a signal identifying whether a passenger is seated in the rear passenger seating area as the occupant classification information received by the airbag deployment tool as part of the vehicle sensor information received at 401.

An OCS sensor may also include a distance measuring sensor (e.g., an IR proximity sensor, or a sonar type of sensor) configured to measure a distance of a rear passenger from another obstacle the rear passenger may collide with in the event of a crash (e.g., rear seat, another passenger, the OCS sensor, etc.), and generate a signal identifying the measured distance as the occupant classification information received by the airbag deployment tool as part of the vehicle sensor information received at 401.

The OCS sensor may also be one or more camera based vision systems used to determine the presence of occupants in rear seats. When the OCS sensor includes the one or more camera based vision systems as described, the video feed generated by the cameras may be the occupant classification information received by the airbag deployment tool as part of the vehicle sensor information received at 401. Alternatively, the video feed may be received by an image processor configured to analyze the received video feed and detect a passenger within the video feed of the rear seating area based on the analysis. It follows that the image processor may then transmit information identifying whether a passenger was detected in the rear seating area based on the analyzed video feed as the occupant classification information received by the airbag deployment tool as part of the vehicle sensor information received at 401.

The OCS sensor may also be a weight sensor located underneath one or more rear seating locations (e.g., driver side, middle, and passenger side) and configured to sense a weight of a passenger, or other object, seated in the rear passenger seating area. It follows that a signal generated by the weight sensor that identifies a weight of a passenger seated in the rear seating area may be the occupant classification information received by the airbag deployment tool as part of the vehicle sensor information received at 401

According to some embodiments, the airbag deployment tool may receive a control panel signal input by a user at a control panel that is part of the vehicle system that manually selects an on/off state for the rear airbag deployment system. It follows that the airbag deployment tool may determine to turn off the deployment capability of the rear airbag deployment system based on the received control panel signal that identifies an on/off state.

At 402, the airbag deployment tool analyzes the vehicle sensor information received at 401. The analysis may include analyzing the vehicle sensor information to determine whether the vehicle has suffered an impact that surpasses an impact threshold that would warrant a deployment of a rear airbag that is part of the rear seat passenger airbag system. The analysis may also include an analysis of the OCS sensor information to determine whether a passenger is seated in the rear seat passenger area. In some embodiments, the analysis of the vehicle sensor information described herein (e.g., video feed type of occupant classification information received from one or more cameras of a vision system in the rear seating area, or weight type of occupant classification information received from one or more weight sensors in the rear seating area) may be able to identify whether a child or adult is seated in the rear seat passenger area. In some embodiments, the analysis of the vehicle sensor information may be able to identify whether a child seat is seated in the rear seat passenger area.

At 403, the airbag deployment tool may make a determination based on the analysis at 402 on whether to deploy the rear airbag. If a determination is made not to deploy the rear airbag, the process may revert back to 401. However, if a determination is made to deploy the rear airbag, the process proceeds to 404. The airbag deployment tool may determine the rear airbag should be deployed when, for example, the vehicle sensor information indicates the vehicle has undergone an impact that necessitates the conditions for deploying the rear airbag, and the analysis of one or more of the vehicle sensor information identifies a passenger is seated in the rear seat passenger area. The airbag deployment tool may determine the rear airbag should not be deployed even when, for example, the vehicle sensor information indicates the vehicle has undergone an impact that necessitates the conditions for deploying the rear airbag, but the analysis of the vehicle sensor information identifies a child or child seat is seated in the rear seat passenger area.

At 404, the airbag deployment tool may transmit a control signal to one or more airbag inflators, or other known types of airbag deployment controls, to deploy the rear airbag when it is determined at 403 that the rear airbag should be deployed.

It should be noted that the process described by flow chart 400 is provided for exemplary purposes, as it is within the scope of the innovation described by the disclosure provided herein to include a fewer, or greater, number of steps.

Figure 5:
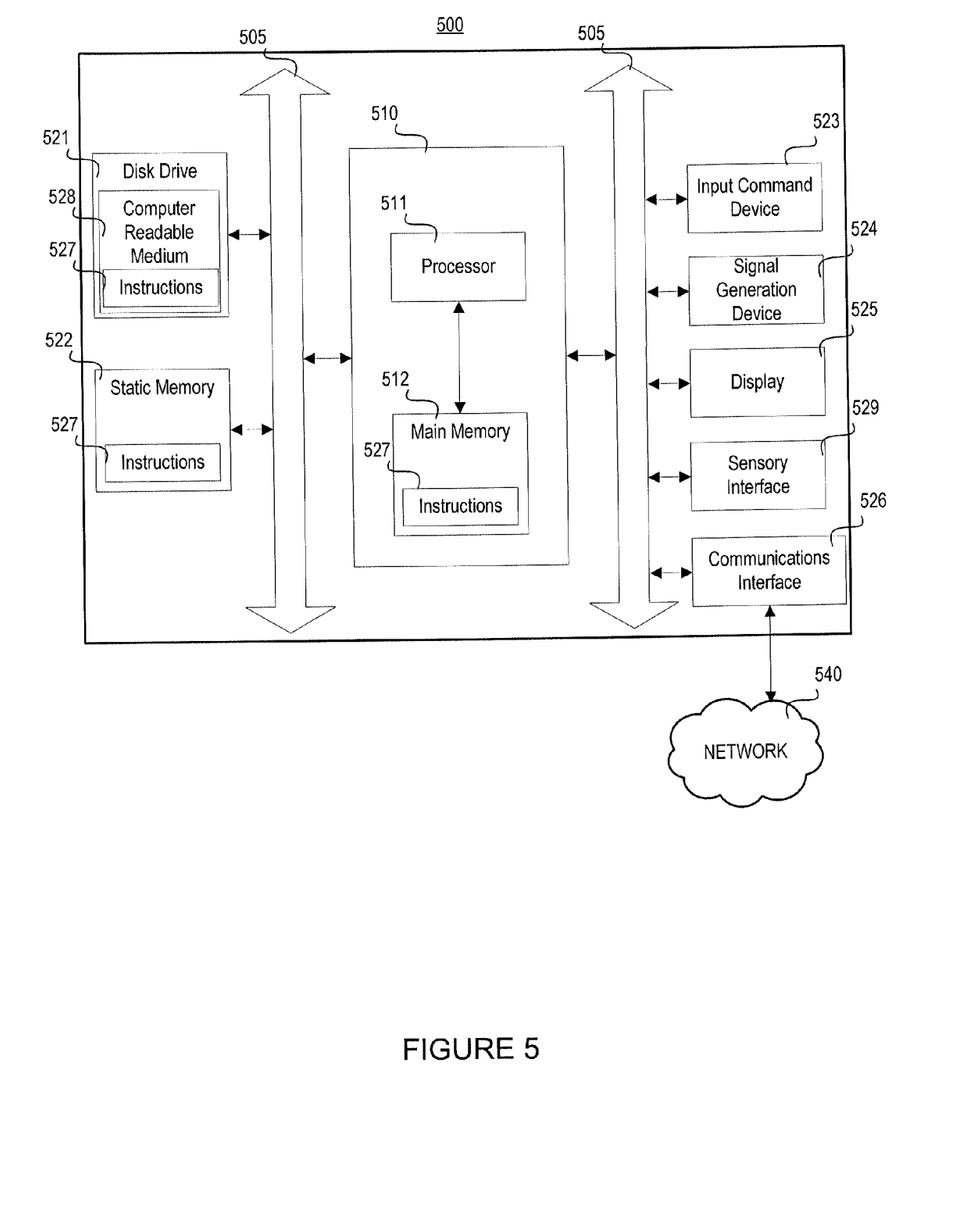
FIG. 5 illustrates an exemplary block diagram for a computing system that may be part of a vehicle system according to some embodiments.

Referring to FIG. 5, an illustrative embodiment of a computing system 500 that may be used for carrying out any one or more of the methods, features, and processes discussed herein. For example, the computing system 500 may be housed within a vehicle and represent the functional components of the vehicle needed to implement the airbag deployment tool.

The computing system 500 may include a processing unit 510 comprised of a processor 511 in communication with a main memory 512, wherein the main memory 512 stores a set of instructions 527 that may be executed by the processor 511 to cause the computing system 500 to perform any one or more of the methods, processes or computer-based functions disclosed herein. For example, the airbag deployment tool described throughout this disclosure may be a program that is comprised of a set of instructions 527 that are executed to perform any one or more of the methods, processes or computer-based functions described herein such as the processes for determining whether to deploy a rear airbag, and controlling the deployment of the rear airbag. Further, while a single computing system 500 is illustrated, the term "system" shall also be taken to include any collection of systems or subsystems that individually or jointly execute a set, or multiple sets, of instructions to perform one or more computer functions.

As illustrated in FIG. 5, the computing system 500 may include the processor 511, such as a central processing unit ("CPU"), a graphics processing unit ("GPU"), or both. Moreover, the computing system 500 can include the main memory 512 and a static memory 522 that can communicate with each other via a bus 505. As shown, the computing system 500 may further include a display unit 525, such as a liquid crystal display ("LCD"), an organic light emitting diode ("OLED"), a flat panel display, a solid state display, or a cathode ray tube ("CRT"). The display unit 525 may correspond to a display component of a navigation system, vehicle infotainment system, a heads-up display, or instrument panel of the vehicle. Additionally, the computing system 500 may include one or more input command devices 523, such as a control knob, instrument panel, keyboard, scanner, digital camera for image capture and/or visual command recognition, touch screen or audio input device, buttons, a mouse or touchpad. The computing system 500 can also include a disk drive unit 521 for receiving a computer-readable medium 528. In a particular embodiment, the disk drive unit 521 may receive the computer-readable medium 528 in which one or more sets of instructions 527, such as the software corresponding to the airbag deployment tool, can be embedded. Further, the instructions 527 may embody one or more of the methods or logic as described herein. In a particular embodiment, the instructions 527 may reside completely, or at least partially, within any one or more of the main memory 512, the static memory 522, computer readable medium 528, and/or within the processor 511 during execution of the instructions 527 by the processor 511. The computer-readable medium 528 can include a solid-state memory such as a memory card or other package that houses one or more non-volatile read-only memories, such as flash memory. Further, the computer-readable medium 528 can be a random access memory or other volatile re-writable memory. Additionally, the computer-readable medium 528 can include a magneto-optical or optical medium, such as a disk or tapes or other storage device to capture information communicated over a transmission medium. Accordingly, the disclosure is considered to include any one or more of a computer-readable medium 528 or a distribution medium and other equivalents and successor media, in which data or instructions may be stored.

The computing system 500 may also include a signal generation device 524, such as a speaker or remote control, and a sensory interface 529. The sensory interface 529 may be configured to receive information obtained by one or more vehicle sensors that are part of the vehicle system. For example, the vehicle system may include one or more impact sensors and one or more OCS sensors, as described herein.

The computing system 500 may further include a communications interface 526. The communications interface 526 may be comprised of a network interface (either wired or wireless) for communication with an external network 540. The external network 540 may be a collection of one or more networks, including standards-based networks (e.g., 2G, 3G, 4G, Universal Mobile Telecommunications System (UMTS), GSM® Association, Long Term Evolution (LTE)™, or more), WiMAX, Bluetooth, near field communication (NFC), WiFi (including 802.11 a/b/g/n/ac or others), WiGig, Global Positioning System (GPS) networks, and others available at the time of the filing of this application or that may be developed in the future. Further, the external network 540 may be a public network, such as the Internet, a private network, such as an intranet, or combinations thereof, and may utilize a variety of networking protocols now available or later developed including, but not limited to TCP/IP based networking protocols.

In some embodiments the program that embodies the airbag deployment tool may be downloaded and stored on any one or more of the main memory 512, computer readable medium 528, or static memory 522 via transmission through the network 540 from an off-site server. Further, in some embodiments the airbag deployment tool running on the computing system 500 may communicate with an information server via the network 540.

Any process descriptions or blocks in the figures, should be understood as representing modules, segments, or portions of code which include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

What is claimed is:

1. A vehicle rear seat airbag deployment system, comprising:
    a roof railing attached to a rear seat airbag; and,
    a processor in communication with an inflator, configured to:
        receive sensor information;
        in response to analyzing the sensor information, control the inflator to inflate a first and second section of the rear seat airbag, above and to fall below the rear seat, respectively.

2. The rear seat airbag deployment system of claim 1, wherein the rear seat airbag is configured to fall from a ceiling above a rear seating area to surround the rear seating area on a passenger side, driver side, and front side of the rear seating area when the processor controls the inflator to inflate the rear seat airbag.

3. The rear seat airbag deployment system of claim 1, wherein the roof railing portion is comprised of a driver side roof rail, a passenger side roof rail, and a center cross member.

4. The rear seat airbag deployment system of claim 3, wherein the inflator is a single inflator attached to the center cross member and configured to inflate the rear seat airbag.

5. The rear seat airbag deployment system of claim 1, wherein the vehicle sensor information includes occupant classification information received from one or more occupant classification sensors identifying whether a passenger is seated in a rear seating area of the vehicle, and vehicle impact information received from one or more impact sensors identifying whether the vehicle has suffered an impact.

6. The rear seat airbag deployment system of claim 5, wherein the processor is configured to analyze the vehicle sensor information to:
    determine whether a passenger is seated in the rear seating area of the vehicle based on the occupant classification information;
    determine whether the vehicle has suffered an impact that surpasses an impact threshold for deploying the rear seat airbag based on the vehicle impact information; and
    control the inflator to inflate the rear seat airbag when a passenger is determined to be seated in the rear seating area and the vehicle is determined to have suffered an impact that surpasses the impact threshold.

7. The rear seat airbag deployment system of claim 5, wherein the occupant classification information includes child presence information identifying whether a child is seated in the rear seating area.

8. The rear seat airbag deployment system of claim 7, wherein the processor is configured to analyze the vehicle sensor information to:
    determine whether a child is seated in the rear seating area of the vehicle based on the child presence information;
    determine whether the vehicle has suffered an impact that surpasses an impact threshold for deploying the rear seat airbag based on the vehicle impact information; and
    control the inflator to not inflate the rear seat airbag when a child is determined to be seated in the rear seating area even though the vehicle is determined to have suffered an impact that surpasses the impact threshold.

9. The rear seat airbag deployment system of claim 5, wherein the occupant classification information comprises weight information for a passenger seated in the rear seating area received from one or more weight measuring occupant classification sensors.

10. The rear seat airbag deployment system of claim 5, wherein the occupant classification information comprises passenger presence information received from one or more infrared proximity sensing occupant classification sensors.

11. A method for deploying a rear seat airbag attached to a roof railing in a vehicle, comprising:
by a processor in communication with an inflator:
receiving sensor information; and,
in response to analyzing the sensor information, controlling the inflator to inflate a first and second section of the rear seat airbag, above and to fall below the rear seat, respectively.

12. The method of claim 11, wherein controlling the rear seat airbag comprises:
controlling a single inflator to inflate the rear seat airbag to fall from the ceiling above the rear seating area to surround the rear seating area on a passenger side, driver side, and front side of the rear seating area.

13. The method of claim 11, wherein the rear seat airbag is attached to a roof railing portion by a plurality of connectors, the roof railing portion comprised of a driver side roof rail, a passenger side roof rail, and a center cross member.

14. The method of claim 13, wherein the plurality of connectors is one of a plurality of tethering members, hooking members, or velcro attachment members.

15. The method of claim 11, wherein the vehicle sensor information includes occupant classification information received from one or more occupant classification sensors identifying whether a passenger is seated in a rear seating area of the vehicle, and vehicle impact information received from one or more impact sensors identifying whether the vehicle has suffered an impact.

16. The method of claim 15, wherein analyzing the vehicle sensor information comprises:
determining whether a passenger is seated in the rear seating area of the vehicle based on the occupant classification information;
determining whether the vehicle has suffered an impact that surpasses an impact threshold for deploying the rear seat airbag based on the vehicle impact information; and
controlling the inflator to inflate the rear seat airbag when a passenger is determined to be seated in the rear seating area and the vehicle is determined to have suffered an impact that surpasses the impact threshold.

17. The method of claim 15, wherein the occupant classification information includes child presence information identifying whether a child is seated in the rear seating area.

18. The method of claim 17, wherein analyzing the vehicle sensor information comprises:
determining whether a child is seated in the rear seating area of the vehicle based on the child presence information;
determining whether the vehicle has suffered an impact that surpasses an impact threshold for deploying the rear seat airbag based on the vehicle impact information; and
controlling the inflator to not inflate the rear seat airbag when a child is determined to be seated in the rear seating area even though the vehicle is determined to have suffered an impact that surpasses the impact threshold.

19. The method of claim 15, wherein the occupant classification information comprises weight information for a passenger seated in the rear seating area received from one or more weight measuring occupant classification sensors.

20. The method of claim 15, wherein the occupant classification information comprises passenger presence information received from one or more infrared proximity sensing occupant classification sensors.

* * * * *